United States Patent [19]

Tachi et al.

[11] Patent Number: 4,946,661

[45] Date of Patent: Aug. 7, 1990

[54] PROCESS FOR REMOVING NITROGEN OXIDES

[75] Inventors: Takahiro Tachi; Akira Kato; Hiroshi Kawagoshi; Hisao Yamashita; Tomoichi Kamo; Shinpei Matsuda, all of Hitachi; Yasuyoshi Kato; Fumito Nakajima, both of Kure, all of Japan

[73] Assignee: Babcock-Hitachi Kabushiki Kaisha, Tokyo, Japan

[21] Appl. No.: 271,540

[22] Filed: Nov. 15, 1988

[30] Foreign Application Priority Data

Nov. 16, 1987 [JP] Japan ................................ 62-289100

[51] Int. Cl.$^5$ .......................... B01J 8/00; C01B 21/00
[52] U.S. Cl. ................................................... 423/239
[58] Field of Search .................. 423/239 A, 239, 235, 423/235 D

[56] References Cited

U.S. PATENT DOCUMENTS

| | | | |
|---|---|---|---|
| 4,085,193 | 4/1978 | Nakajima et al. | 423/239 |
| 4,141,959 | 2/1979 | Kato et al. | 423/239 |
| 4,188,365 | 2/1980 | Yoshioka et al. | 423/239 |
| 4,221,768 | 9/1980 | Inoue et al. | 423/239 |

*Primary Examiner*—Gregory A. Heller
*Attorney, Agent, or Firm*—Fay, Sharpe, Beall, Fagan, Minnich & McKee

[57] ABSTRACT

A process for removing nitrogen oxides from exhaust gases containing volatile metal compounds with good efficiency by contacting the gases with a catalyst comprising $TiO_2$, difficulty reduced by the compounds, in the presence of ammonia, and such a catalyst are provided, which process is characterized in that the average pore diameter of the $TiO_2$ is 10,000 Å or less and the proportion of the volume of pores having pore diameters of 400-5,000 Å to the total pore volume is 50% or more; a denitration-active component is supported on the $TiO_2$; a catalyst carrier precursor comprising an aqueous slurry sol of $TiO_2$ or Ti hydroxide prepared by hydrolyzing a Ti salt is precalcined at 150°-700° C., followed by adding a denitration-active component and then normally calcining the mixture; and a polymer compound having a thermal decomposition temperature of 110° to 300° C. is added in 1–20% by weight to the catalyst carrier precursor, followed by precalcining the mixture at the thermal decomposition temperature or higher.

2 Claims, 2 Drawing Sheets

PROCESS FOR REMOVING NITROGEN OXIDES

BACKGROUND OF THE INVENTION

1. Field of the Invention

This invention relates to removal of nitrogen oxides and a catalyst used therefore. Particularly it relates to a catalyst the activity of which is not reduced easily due to volatile metal compounds contained in exhaust gases and a process for removing nitrogen oxides by the use of the catalyst with a good efficiency.

2. Description of the Related Art

The process of reducing and removing nitrogen oxides ($NO_x$) contained in various exhaust gases with ammonia ($NH_3$) is simple in the system and efficient; hence the process has constituted a main stream of denitration processes for exhaust gases generated from various sources, including boiler combustion exhaust gases. For the process, the so-called denitration catalysts for promoting the reaction of $NO_x$ with $HN_3$ have been necessary and a number of inventions have so far been made. Among the catalysts, those which have currently been practically used are represented by catalysts disclosed in Japanese patent application laid-open Nos. Sho 50-51966/1975 and Sho 52-122293/1977, that is, those obtained by adding oxide(s) such as vanadium (V), molybdenum (Mo), tungsten (W), iron (Fe), etc. to titanium oxide ($TiO_2$) as a main component. These catalysts are superior in that even when ionic oxides are contained in exhaust gases, they are difficultly deteriorated to exhibit a high denitration performance.

However, as to such conventional catalysts, no consideration has been taken about reduction in the catalyst activity caused by volatile metal compounds formed mainly from mineral components contained in fuels, i.e. oxides of selenium, tellurium, thallium, arsenic, etc. and compounds of alkali metals, alkaline earth metals, etc. together with the above compounds. In recent years, coal and oil containing a large quantity of mineral substances have been used to bring about a tendency that the concentration of the above volatile metal compounds contained in exhaust gases increases. However, when the above-mentioned conventional catalysts are used for denitration of exhaust gases, a problem has been raised that the activity is lowered to a large extent.

SUMMARY OF THE INVENTION

The object of the present invention is to provide a catalyst having prevented its activity reduction due to volatile metal compounds contained in exhaust gases and a denitration process using the catalyst.

The present invention in a first aspect resides in;

a process for removing nitrogen oxides by contacting an exhaust gas containing the nitrogen oxides with a catalyst comprising titanium oxide in the presence of ammonia, wherein said exhaust gas contains volatile metal compounds; the average pore diameter of said titanium oxide is 10,000 Å or less; and the proportion of the volume of pores having pore diameters of 400 to 5,000 Å to the total pore volume is 50% or more.

The present invention in a second aspect resides in;

a catalyst for removing nitrogen oxides through catalytic reduction with ammonia, wherein said catalyst has a denitration-active component supported on a titanium oxide having an average pore diameter of 10,000 Å or less and a proportion of the volume of pores having pore diameters of 400 to 5,000 Å to the total pore volume of 50% or more.

The present invention in a third aspect resides in;

a process for producing a catalyst for removing nitrogen oxides through catalytic reduction with ammonia, which process comprises preliminarily calcining a catalyst carrier precursor comprising an aqueous slurry sol of titanium oxide or titanium hydroxide obtained by hydrolyzing a titanium salt at a temperature of 150° to 700° C., followed by adding a denitration-active component to the calcined material and then calcining the resulting mixture.

DETAILED DESCRIPTION OF THE INVENTION

Figure 1:
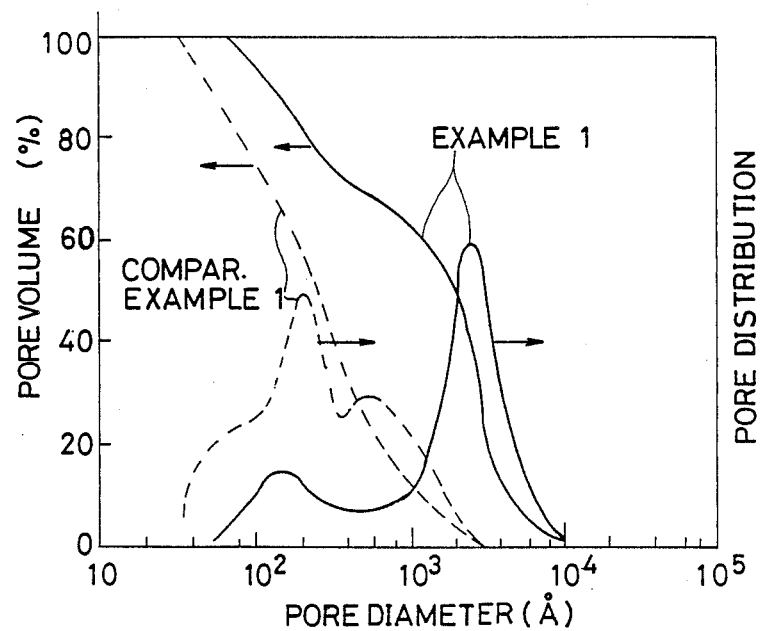
FIG. 1 and FIG. 2 each show a chart illustrating the results of Examples of the present invention, i.e. a relationship of the catalyst pore volume or pore distribution relative to the pore diameter of the catalyst.

The catalyst of the present invention is far less in the activity reduction due to volatile metal compounds than catalysts containing conventional titanium oxide. At present, the reason is unclear, but it is considered that since pores having diameters of 400 to 10,000 Å increase as compared with catalysts containing conventional titanium oxide, condensation of volatile metal compounds therein difficultly occurs to thereby make it possible to prevent the activity reduction.

The catalyst of the present invention contains at least titanium oxide and have an average pore diameter of 10,000 Å or less, the volume of pores having pore diameters of 400 to 5,000 Å, preferably 400 to 2,000 Å occupying 50% or more, preferably 60% or more of the total pore volume. If the volume of pores having pore diameters less than 400 Å occupies 50% or more of the total pore volume, volatile metal compounds are liable to condense and the catalyst is liable to be poisoned, while if the volume of pores having pore diameters exceeding 5,000 Å occupies 50% or more of the total pore volume, the catalyst activity is low and hence not practical.

Further, as to the titanium oxide used in the process of the present invention, when various components exhibiting a denitration activity, for example, oxides of V, Mo, W, Mn, Fe, Cr, Ce, Cu, Ni, etc., composite oxides therewith and/or sulfates thereof are added to the titanium oxide, a catalyst having a high activity is obtained. Among these, V, Mo, W or V-Mo composite oxides and V-Mn composite oxides are superior. Further, in order to improve the catalyst properties such as strength, it is also possible to add various additives such as $SiO_2$, $Al_2O_3$, etc.

As the catalyst form, any of pellet form, spherical form, cylindrical form, three-dimensional network, etc. can be used.

As processes for controlling the pore volume of the catalyst and causing the pore volume of pore having pore diameters of 400 to 5,000 Å to occupy 50% or more of the total pore volume, there are a preliminary calcination (hereinafter referred to as precalcination) process and a polymer compound-addition process. In addition, "preliminarily calcine" will hereinafter be referred to as "precalcine".

The precalcination process refers to a process of precalcining the precursor of the catalyst carrier containing titanium oxide, in advance of supporting the above-mentioned denitration-active component, at a temperature of 150° to 700° C., preferably 150° to 350° C., more preferably 250° to 350° C., followed by adding the denitration-active component and carrying out a normal calcination. If the precalcination temperature is lower than 150° C., the effect of controlling the pore volume is inferior and the catalyst is liable to be poisoned, while if it exceeds 700° C., the specific surface area of the carrier is reduced and the catalyst activity lowers; hence such higher temperatures are not practical. Examples of the precursor of the catalyst carrier are a slurry sol of titanium oxide, titanium hydroxide prepared by hydrolyzing various titanium salts such as titanium sulfate, titanium tetrachloride, etc., to form precipitates, etc. Further, in order to improve the strength of the carrier, etc., those having added additives such as $SiO_2$, $Al_2O_3$, $ZrO_2$, etc. may also be used. The normal calcination temperature is preferred to be in the range of 150° to 700° C.

The polymer compound-addition process refers to a process of mixing a polymer compound with the above-mentioned precursor of the catalyst carrier in advance, followed by carrying out precalcination and then having a catalyst active component supported on the resulting material. Examples of the polymer compound are those having a thermal decomposition temperature of 150° to 400° C., preferably 300° C. or lower such as polymer compounds e.g. PVA (polyvinyl alcohol), PVB (polyvinyl butyrate), PEO (polyethylene oxide), etc. Among these, polyvinyl alcohol is particularly preferred. The quantity of the polymer compound added is in the range of 1 to 20% by weight, preferably 1 to 10% by weight. If it is less than 1% by weight, the effectiveness is small, while if it exceeds 20% by weight, the average pore diameter exceeds 5,000 Å to reduce the denitration performance. The precalcination temperature is the thermal decomposition temperature of the polymer compound or higher. For example, in the case of PVA, its decomposition temperature is about 400° C.; hence the precalcination temperature may be the above temperature or higher, but if the decomposition temperature exceeds 700° C., the specific surface area of the carrier is reduced; hence such higher temperatures are not practical. Pores having a large diameter are formed at the part where the polymer compound is decomposed by heat and volatized off from the carrier. After the catalyst active component has been supported, the resulting catalyst is generally subjected to normal calcination, and this calcination temperature is in the range of 150° to 700° C., preferably 300° to 700° C. If the polymer compound is added after precalcination, the effect of the present invention is reduced.

As described above, when the titanium oxide catalyst carrier which has pore diameters of 10,000 Å or less and in which the pore volume of pores having pore diameters of 400 to 5,000 Å occupies 50% or more of the total pore volume, is used, it is possible to prevent condensation in the catalyst, of volatile metal oxides contained in exhaust gases to thereby retain a high activity.

The temperature at which the denitration reaction is carried out using the catalyst of the present invention is preferred to be in the range of 150° to 600° C., particularly in the range of 200° to 550° C. The denitration activity is reduced outside the above temperature range.

The present invention will be described in more detail by way of Examples.

In addition, measurements of the pore volume and pore diameter of the catalyst of the present invention were carried out according to pressurized mercury injection method.

Example 1

A catalyst used in the process of the present invention was prepared as follows:

Metatitanic acid slurry (the content of the acid in terms of $TiO_2$: 30% by weight) (100 g) was dried at 100° C., followed by precalcining the resulting powder at 500° C. for 4 hours to obtain powder of titanium oxide as carrier, sufficiently kneading the carrier powder together with ammonium molybdate (7.1 g) and ammonium vanadate (2.0 g) by means of a mixing and grinding machine, drying the resulting material at 200° C., adding graphite (1% by weight), forming the mixture into tablets of 6 mm in diameter and 6 mm high and subjecting the tablets to a normal calcination at 500° C. for 2 hours to obtain Example catalyst 1. This catalyst contained $MoO_3$ and $V_2O_5$ in a molar ratio of Ti/Mo/V=86/10/4.

Examples 2-4

Catalysts were prepared in the same manner as in Example 1 except that the precalcination temperature in Example 1 was varied to 150° C. (Example 2), 300° C. (Example 3) and 700° C. (Example 4), to obtain Example catalysts 2-4.

Comparative example 1

Comparative catalyst 1 was obtained in the same manner as in the case of Example catalyst 1 except that no precalcination was carried out and ammonium molybdate and ammonium vanadate were directly added to the metatitanic acid slurry, followed by sufficiently kneading the mixture by means of a mixing and grinding machine.

The pore volumes and pore distributions of the catalysts obtained in Examples 1-4 and Comparative example 1 were measured according to pressurized mercury injection method.

FIG. 1 shows the pore volumes and pore distributions relative to the pore diameters in Example 1 and Comparative example 1. As seen from FIG. 1, as to the catalyst of Comparative example 1, the maximum peak of the pore diameters is observed at 200 Å and the volume of pores having pore diameters of 300 Å or less occupies 55% of the total pore volume, whereas as to the catalyst of Example 1, the maximum peak of the pore diameters is observed at about 3,000 Å and the pore volume of pores in the range of 400 to 5,000 Å occupies 62% of the total pore volume.

The pore distributions and pore volumes in Examples 2, 3 and 4 were similarly measured. The results were as follows: In Example 2 (precalcination temperature: 150°C.), the maximum peak was 900 Å and the pore volumes of 400 to 5,000 Å was 52% of the total pore volume, in Example 3 (precalcination temperature: 300° C.), the maximum peak was 1,500 Å and the pore proportion of 400 to 1,500 Å was 58%; and in Example 4 (precalcination: 700° C.), the maximum peak was 4,200 Å and the pore proportion of 400 to 1,500 Å was 70%.

With the catalysts of Examples 1 to 4 and Comparative example 1 having the above-mentioned different physical properties, denitration performance was examined according to the method described below in Experimental example 1.

Experimental example 1.

With the catalysts of Examples 1 to 4 and Comparative example 1, durability tests (accelerated tests) were carried out using a model gas having supposed coal combustion exhaust gases having a high content of mineral substances. As the catalyst poison component, $SO_3$ and $As_2O_3$ which are oxidation products of arsenopyrite generally known as mineral substances contained in coal were vaporized and added to a gas. Test conditions are shown below in Table 1.

TABLE 1

| Item | Conditions |
| --- | --- |
| Gas composition | |
| NO | 300 ppm |
| $NH_3$ | 360 ppm |
| $SO_2$ | 500 ppm |
| $SO_3$ | 50 ppm |
| $As_2O_3$ | 140 ppm |
| $CO_2$ | 12% |
| $H_2O$ | 12% |
| $O_2$ | 3% |
| $N_2$ | balance |
| Reaction temperature | 350° C. |
| Space velocity | 12,000 $h^{-1}$ |
| Catalyst form | 10 ~ 20 Mesh, granular |

The durability tests were carried out for 30 minutes, and the denitration performances of the catalysts were measured before and after the tests. The measurement was carried out employing an atmospheric pressure, flow type, fixed bed reaction apparatus. The reaction tube was a silica glass tube having an inner diameter of 20 mm. This reaction tube was heated in an electric furnace and the temperature was measured by means of a thermocouple. A catalyst having its particle size adjusted to 10 to 20 meshes (2 ml) was placed in the central part of the reaction tube, followed by carrying out durability tests under the conditions indicated in Table 1. An $NO_x$ analyzer of chemiluminescence type was used for $NO_x$ analysis, and the percentage removal of $NO_x$ was sought according to the following equation:

$$\text{Percentage removal of } NO_x = \left(1 - \frac{\text{concentration of outlet } NO_x}{\text{concentration of inlet } NO_x}\right) \times 100(\%)$$

The results are shown in Table 2. As seen from Table 2, the catalyst of the present invention is hard to be deteriorated as compared with the catalyst of Comparative example.

TABLE 2

| | Percentage removal of $NO_x$ | |
| --- | --- | --- |
| Catalyst | Initial period | After durability test |
| Example 1 | 87 | 58 |
| Example 2 | 94 | 51 |
| Example 3 | 94 | 65 |
| Example 4 | 80 | 50 |
| Comp. ex. 1 | 93 | 46 |

As seen from Table 2, the catalysts of Examples 1 to 4 of the present invention are less to be poisoned and superior in the durability as compared with the catalyst of Comparative example 1.

Example 5

Figure 2:
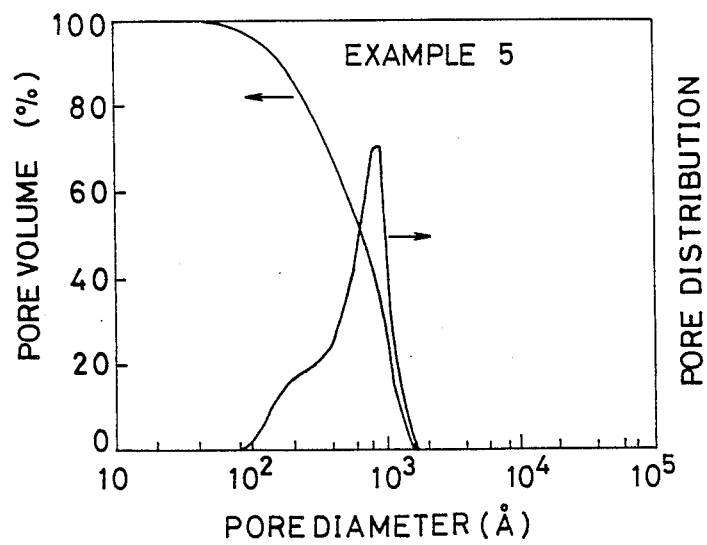

In this Example, the metatitanic acid slurry used in Example 1 was precalcined at 100° C. to obtain powder of titanium oxide carrier. To this carrier powder was added 5% by weight of PVA (polyvinyl alcohol), followed by sufficiently kneading the mixture by means of a mixing and grinding machine, drying the resulting material at 200° C., calcining it at 500° C. for 2 hours and having $MoO_3$ and $V_2O_5$ supported on the resulting carrier powder in the same manner as in Example 1 to obtain Example catalyst 5. Its pore volume and pore distribution were measured according to pressurized mercury injection method. The results are shown in FIG. 2. As seen from the figure, the maximum peak of the pore diameters was present at 950 Å and the pore volume of pores of 400 to 5,000 Å occupied 65% of the total pore volume.

Examples 6–8

Example 5 was repeated except that the quantity of PVA added in Example 5 was varied to 2% (Example 6), 8% (Example 7) or 10% (Example 8), to obtain Example catalysts 6–8. The maximum peaks of the pore diameters and the proportions of the pore volumes of pores of 400 to 5,000 Å to the total pore volumes of these catalysts were 500 Å and 51% in Example 6, 1,100 Å and 68% in Example 7, and 3,500 Å and 75% in Example 8, respectively.

Example 9

Example 5 was repeated except that PVA was replaced by PEO (polyethylene oxide). The maximum peak of the pore diameters of this Example catalyst was 1,100 Å and the proportion of the pore volume of pores of 400 to 5,000 Å to the total pore volume thereof was 68%.

The denitration performances of the above catalysts of Examples 5 to 9 were examined in the same manner as in Experiment example 1. The results are shown in Table 3

TABLE 3

| | Percentage removal of $NO_x$ (%) | |
| --- | --- | --- |
| Catalyst | Initial period | After durability test |
| Example 5 | 90 | 60 |
| Example 6 | 88 | 55 |
| Example 7 | 86 | 58 |
| Example 8 | 84 | 56 |
| Example 9 | 87 | 59 |

As shown in Examples 1 to 9 and Comparative example 1, when a catalyst having pore diameters of 10,000 Å or less and a proportion of the pore volume of pores having pore diameters of 400 to 5,000 Å to the total pore volume, of 50% or more is used, it is possible to inhibit the catalyst from being poisoned by volatile metal compounds.

According to the present invention directed to a process for removing nitrogen oxides contained in exhaust gases by contacting the gases with a catalyst, it is possible to prevent the catalyst from being poisoned by volatile metal compounds contained in exhaust gases and also to treat exhaust gases containing a large quantity of volatile metal compounds such as those of Se, As, etc. to which conventional denitration catalysts could not have been applied due to their notable deterioration.

Further, due to small deterioration and high activity, it is possible to reduce the quantity of the catalyst used.

What is claimed is:

1. A process for removing nitrogen oxides from an exhaust gas, comprising the step of:

contacting an exhaust gas containing the nitrogen oxides in the presence of ammonia with an effective amount of a denitrating catalyst which includes titanium oxide, wherein said exhaust gas contains volatile metal compounds; the average pore diameter of said titanium oxide is 10,000 Å or less; and the proportion of the volume of pores having pore diameters of 400 to 5,000 Å to the total pore volume is 50% or more.

2. A process according to claim 1, wherein the proportion of the volume of pores having pore diameters of 400 to 2,000 Å to the total pore volume is 60% or more.

* * * * *